United States Patent
Cho

(10) Patent No.: US 7,113,579 B2
(45) Date of Patent: Sep. 26, 2006

(54) METHOD OF CONFERENCE CALLING SUPPLEMENTAL SERVICE USING INTELLIGENT PERIPHERAL IN INTELLIGENT NETWORK

(75) Inventor: Sung Bum Cho, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 09/897,972

(22) Filed: Jul. 5, 2001

(65) Prior Publication Data

US 2002/0003869 A1    Jan. 10, 2002

(30) Foreign Application Priority Data

Jul. 6, 2000    (KR) ............... 2000-38499

(51) Int. Cl.
*H04M 3/42* (2006.01)
*H04M 15/00* (2006.01)
*H04L 12/16* (2006.01)

(52) U.S. Cl. .................. 379/202.01; 379/201.01; 379/114.28; 370/260

(58) Field of Classification Search .......... 379/202.01, 379/223, 67.1, 114.28, 201.01; 370/260
See application file for complete search history.

(56) References Cited

U.S. PATENT DOCUMENTS

| 5,483,588 | A | * | 1/1996 | Eaton et al. ............ 379/202.01 |
| 5,912,961 | A | * | 6/1999 | Taylor et al. ........... 379/221.11 |
| 6,005,845 | A | * | 12/1999 | Svennesson et al. ........ 370/260 |
| 6,044,142 | A | * | 3/2000 | Hammarstrom et al. .... 379/223 |
| 6,373,930 | B1 | * | 4/2002 | McConnell et al. ... 379/114.28 |
| 6,377,673 | B1 | * | 4/2002 | Cho et al. .............. 379/201.01 |
| 6,424,702 | B1 | * | 7/2002 | Blumenschein et al. ... 379/67.1 |
| 6,425,005 | B1 | * | 7/2002 | Dugan et al. ............... 709/223 |
| 6,687,337 | B1 | * | 2/2004 | Blumenschein et al. ... 379/67.1 |

* cited by examiner

*Primary Examiner*—Wing Chan
*Assistant Examiner*—Thjuan P. Knowlin
(74) *Attorney, Agent, or Firm*—Fleshner & Kim, LLP

(57) ABSTRACT

A method of providing supplemental service for conference calling using an intelligent peripheral in an intelligent network is disclosed. By using a specific resource of an IP, various good quality services can be provided by connecting a Service Switching Point (SSP), a Service control Point (SCP), and an Intelligent Peripheral (IP) by a No. 7 common channel signaling network.

21 Claims, 4 Drawing Sheets

- —— BEARER CONNECTION FOR DATA TRANSMISSION OF SERVICE SUBSCRIBER
- ----- VIOCE CHANNEL
- —·— CONNECTION BY NO.7 COMMON CHANNEL SIGNALING NETWORK
- —— CONNECTION BY DATA NETWORK OR INTERNAL NETWORK

METHOD OF CONFERENCE CALLING SUPPLEMENTAL SERVICE USING INTELLIGENT PERIPHERAL IN INTELLIGENT NETWORK

BACKGROUND OF THE INVENTION

1. Field of the Invention

The present invention relates to a communication network, and more particularly to a method of providing a supplemental service in an intelligent network.

2. Background of the Related Art

With varying needs of subscribers and network operators and the development of No. 7 common channel network techniques, types and functions of intelligent network services are being steadily increased.

Supplemental services of an intelligent network currently include a number conversion service, for converting a logical, virtual number provided to a service subscriber by an intelligent network service logic into an actual telephone number, a billing service, for making a charging method adaptable by the various forms of billing according to a service type, and a limiting service, for verifying and limiting a specific qualification, such as an access condition and connection permission range. Additional supplemental services include an incoming call completion service, conference calling service, malicious call tracking service, mass calling service, telephone voting service, virtual private network service, and so forth.

FIG. 1 illustrates a physical structure of a general intelligent network. As shown in FIG. 1, a general intelligent network includes a Service Switching Point (SSP) 1, a Service Control Point (SCP) 3, and an Intelligent Peripheral (IP) 2. These elements are connected through a No. 7 common channel signaling network 4 in which a telephone line and a signaling line are hierarchically separated, thus generating and managing a new service more rapidly and conveniently.

The SSP 1 performs an exchange function for intelligent network call connection, a call control function, a substitute function for the call control function, a service exchange function, and a service function. The SCP 3 performs the call control function, and is linked to the SSP 1 to control supplemental services of the intelligent network and to manage a database.

The IP 2 has specific resources, such as customized information broadcasting, voice recognition, voice synthesis, voice recording, Dual Tone Multi-Frequency (DTMF) code collection, protocol change, and facsimile document processing. The IP 2 enables a flexible communication between a subscriber and the intelligent network.

Among the supplemental services, the conference calling service is a service that supports a call connection between multiple parties (three or more persons). The number of terminal subscribers (conference participants) that can connect to the service is determined according to transfer and bridging requirements. This service is divided into a Conference Calling Add-On (CCAO) process and Conference Calling Meet-Me (CCMM) process according to a connection control type.

The CCAO process is a process in which a chairperson initially reserves a conference calling resource, and controls the multiple party call connection by connecting or disconnecting each conference participant when the conference calling service is activated.

The CCMM process is a process in which the chairperson initially reserves a conference calling resource, and each participant participates in a conference call by inputting a predetermined number at the reserved starting time of the conference call.

In the conference calling service, after the chairperson has reserved the date and time of the conference, the length of the time of the conference, etc., each participant dials a designated number at a designated date and time. A DTMF code generated by the dialing is sent to the SCP 3 via the SSP 1. The SCP 3 allows a subscriber to participate in the conference call by analyzing the information of the corresponding DTMF code. In this way, the conventional conference call service does not use a specific resource of the IP 2, and is provided in the form of only an accept conference request message and reject conference request message of a conference treatment indicator between the SSP 1 and the SCP 3.

As described above, since the functions of the conventional conference calling supplemental service support only voice calls between multiple subscribers, it is difficult to satisfy the needs of the subscribers who want various services, and there is a limit to the development of a new service item.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a system and method of conference calling supplemental services in an intelligent network that can provide subscribers with a variety of services, such as a voice service including conference participant information and conference withdrawee information and a conference call recording service.

It is another object of the present invention to provide a system and method of conference calling supplemental services in an intelligent network by connecting an intelligent peripheral to a conventional conference calling service system that has supported only voice calls between the subscribers.

It is another object of the present invention to provide a method of conference calling supplemental service in an intelligent network that provides functions such as voice guidance and voice recording using an intelligent peripheral that is a specific resource of the intelligent network.

To achieve at least these objects in whole or in parts, there is provided a method of conference calling supplemental service using an IP in an intelligent network having a conference call announcing service that includes a step in which a subscriber requests a SSP to send a conference calling service, a step in which the SCP drives a conference calling service logic program by analyzing an Initial_DP received from the SSP, a step in which the SCP transfers a RRBCSM requesting an intelligent network basic call processing function to the SSP, a step of setting a route between a SCP and an IP, a step of setting a route between a SSP and the IP, and a step of processing an announcement of service guidance.

To further achieve at least the above objects in whole or in parts, there is provided a method of a conference calling supplemental service using an IP in an intelligent network, wherein a conference call recording service comprises a step in which a subscriber requests a SSP to send a conference calling service, a step in which the SSP drives a conference calling service logic program by analyzing an Initial_DP received from the SSP, a step in which the SCP transfers a RRBCSM requesting an intelligent network basic call processing function to the SSP, a step of setting a route between a SCP and an IP, a step of setting a route between a SSP and the IP, a step of processing an announcement of service guidance, and a step for processing the conference call recording service.

To further achieve at least the above objects in whole or in parts, there is provided a method of providing a conference call supplemental service in an intelligent network, including analyzing a call and driving a conference calling service logic program at a Service Control Point (SCP) of a communication network, performing an intelligent network basic call processing function at a Service Switch Point (SSP) of the communication network, establishing a temporary connection between the SCP and an intelligent peripheral (IP), setting a route between the SSP and the IP, announcing the service to a subscriber using the route between the SSP and the IP, and collecting and processing subscriber information.

To further achieve at least the above objects in whole or in parts, there is provided a method of providing a conference calling supplemental service using an Intelligent Peripheral (IP) in an intelligent network, including requesting a Service Switch Function (SSF) to initiate a conference calling service, sending a message from the SSF to a Service Control Function (SCF) to cause the SCF to analyze a call and drive a conference calling service logic program, analyzing the initial detection point message and driving a conference calling service logic program at the SCF, sending a message from the SCF to the SSF to request an intelligent network basic call processing function, sending a message from the SCF to the SSF to establish a temporary connection between a Service Control Point (SCP) and an IP, setting a route between a Service Switch Point (SSP) and an IP, and providing an announcement of service to a subscriber using the route between the SSP and the IP and collecting and processing subscriber information.

To further achieve at least the above objects in whole or in parts, there is provided a communication system, including a Service Control Point (SCP) coupled to a No. 7 signaling network, and configured to analyze a call and drive a conference calling service logic program, a Service Switching Point (SSP) coupled to the No. 7 signaling network, and configured to perform an intelligent network basic call processing function; and an intelligent peripheral (IP) coupled to the No. 7 signaling network, wherein a route is established between the SSP and the IP to perform a conference calling supplemental service using the IP.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
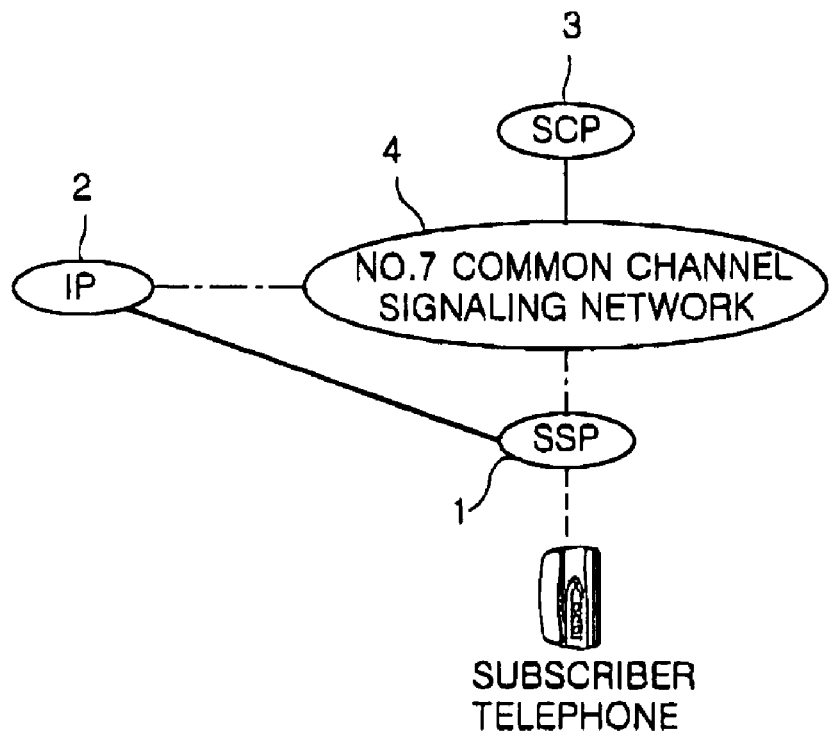
FIG. 1 is a drawing illustrating a physical structure of a general intelligent network.
Figure 2:
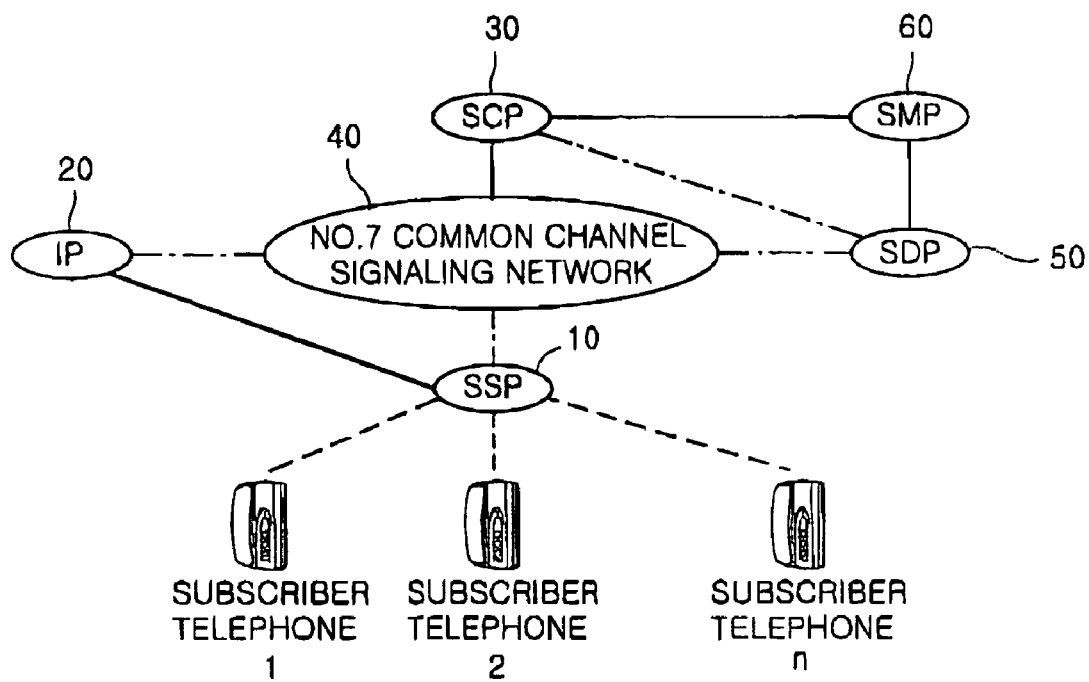
FIG. 2 is a drawing illustrating a physical structure of an intelligent network according to the preferred embodiments of the present invention.
Figure 2:
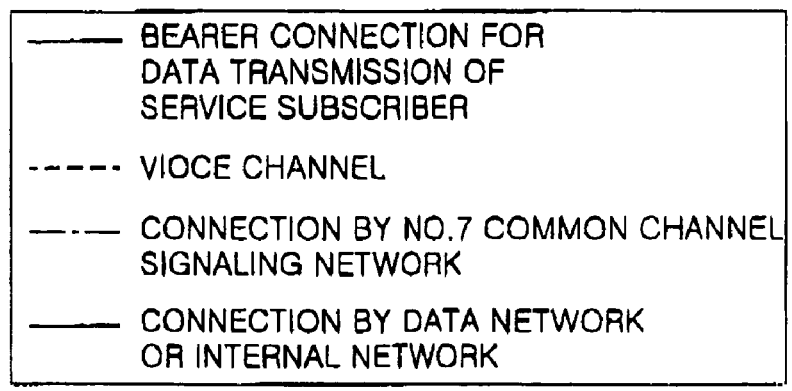

Referring to FIG. 2, a physical structure of an intelligent network according to the preferred embodiments preferably includes a SSP 10, an IP 20, a SCP 30, and a No. 7 common channel signaling network 40. The network further includes a Service Data Point (SDP) 50, and a Service Management Point (SMP) 60. Additionally, a plurality of subscriber telephones, 1, 2, . . . n are shown.

Figure 3:
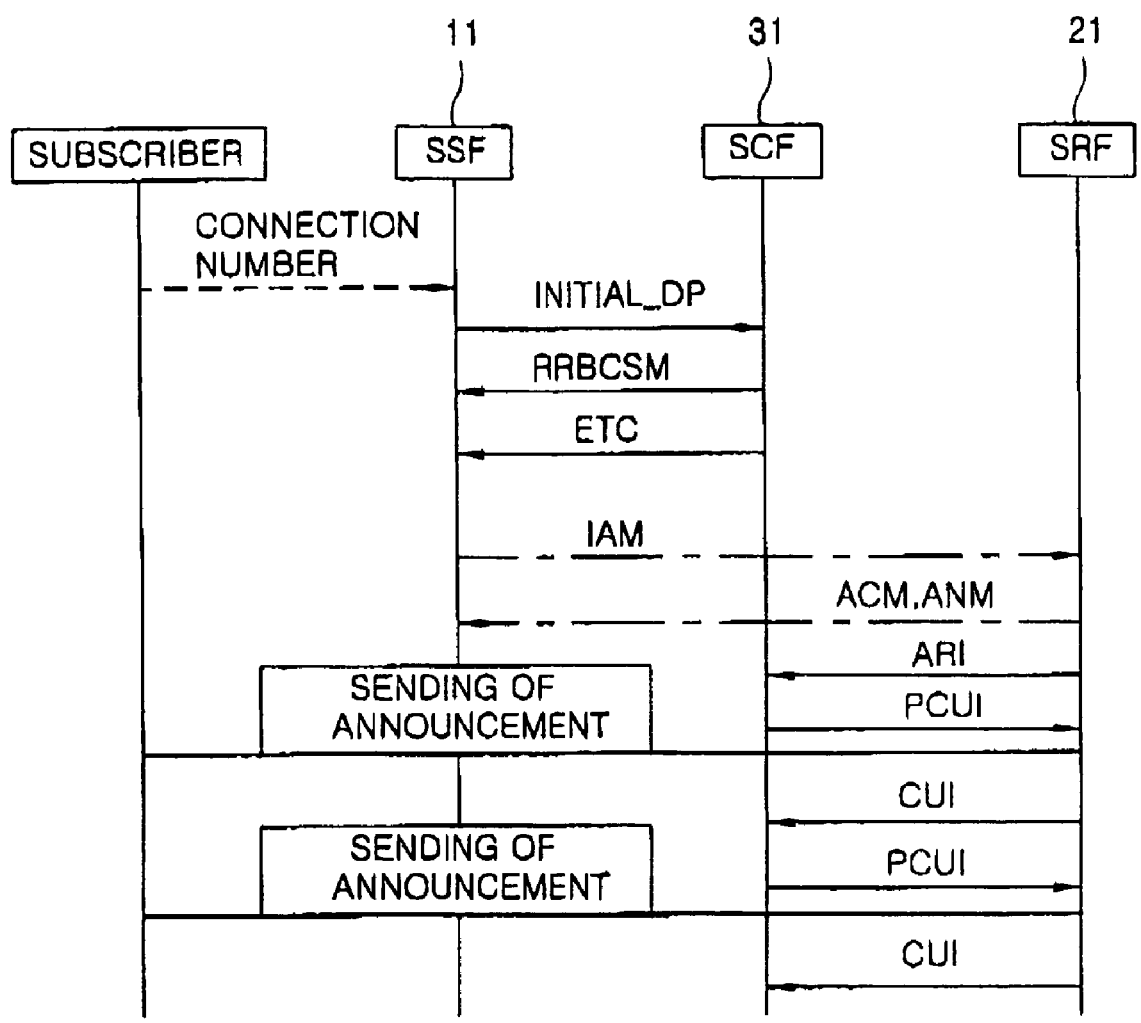
FIG. 3 is a drawing illustrating a method of providing a supplemental service in an intelligent network according to a first embodiment of the present invention.

Referring to FIG. 3, the SSP 10 functionally includes a Service Switching Function (SSF) 11. The SSP 10 performs a function for connecting a service subscriber and the intelligent network. It recognizes an intelligent network call among subscriber calls and notifies the SCP 30 of that call. It then connects the call to a desired destination upon receipt of information necessary for processing the intelligent network call from the corresponding SCP 30. Finally, it preferably records the length of time of the call or sending/destination number in a storage medium, such as on a disk or magnetic tape.

The IP 20 functionally includes a Service Resource Function (SRF) 21, and preferably is connected to more than one SSP 10 or SCP 30 via the No. 7 common channel signaling network 40. The IP 20 collects various data, such as voice, DTMF codes, modulation voice, etc. from the service subscriber. It also provides specific resources, such as announcement of voice guidance, recording of calls, text-to-voice conversion, or signaling sound. It also supports a flexible and effective data exchange between the service subscriber and the network.

The SCP 30 functionally includes a Service Control Function (SCF) 31, and is connected to the SSP 10 and the IP 20 via the No. 7 common channel signaling network 40. The SCP 30 preferably has a database system to provide service control logic and subscriber data information so that the SSP 10 can process the intelligent network service call. In addition, the SCP 30 must process mass transactions in on-line real time by concentrating the intelligence of the network on the center, and it is connected to the SMP 60 via a data network or internal connection network.

The SDP 50 maintains subscribers' network data necessary for executing intelligent network services, and communicates with the SCP 30 in order to provide data in real time.

The SMP 60 is a management system supporting the SCP 30. It manages the record of the subscribers' data needed for service control, reports on various measurement data and service processing errors of the corresponding SCP 30, and outputs network management information.

In the preferred embodiments, a data flow between the functional entities (SSF 11, SRF 31, SCF 21) is converted into a transmission/receiving operation between the physical entities (SSP 10, IP 20, SCP 30). A procedure showing a flow of signals and information for a conference call guidance announcing service is shown in FIG. 3.

Referring to FIG. 3, a subscriber who convenes a conference first dials a service code by making a handset off-hook.

This code (the connection number) is translated by an originating station, and thereafter is routed to the SSF 11 along with the numbers of the subscribers who will participate in the conference.

The SSF 11 transfers an Initial Detection Point (Initial_DP) to the SCF 31, and the SCF 31 analyzes the call to determine whether it is an intelligent network call. The SCF 31 also drives a conference calling service logic program. The SSF 11 then establishes a temporary connection between the SCP 30 and the IP 20 upon receipt of a Request Report Basic Call State Mode (RRBCSM) requesting an intelligent network basic call processing and an Establish Temporary Connection (ETC) indicating a connection between the SCP 30 and the IP 20 from the SCF 31.

Next, the SRF 21 receives an Initial Address Message (IAM) from the SSF 11, which answers with an Address Complete Message (ACM) or an Answer Message (ANM). A connection path is thus formed for transmitting the announcement of guidance and subscriber information between the IP 20 and the SSP 10.

Meanwhile, the SCF 31 receives/records an Assist Request Instruction (ARI) from the SRF 21, meaning that the IP 20 can send the announcement, and sends a Prompt and Collect User Information (PCUI) command to the SRF 21 to instruct the SRF 21 to execute a Prompt and Collect User Information (PCUI). The PCUI is a command indicating that the IP 20 should send the announcement to the SSP 10 and collect digits and DTMF codes from subscribers. Here, the collected digits and DTMF codes are referred to as a Collected User Information (CUI).

The CUI is then sent from the SRF 21 to the SCF 31. The SCF 31 analyzes the user's selection and request upon receipt of the CUI from the SRF 21, and sends a PCUI command to the SRF 21 to instruct the SRF 21 to again execute the PCUI thereby causing the IP 20 send the announcement of the contents satisfying the user's selection and request.

The process in which the SCF 31 collects the CUI from the subscriber and instructs the SRF 21 to execute the PCUI is repeated until the subscriber is provided with a desired service.

Figure 4:
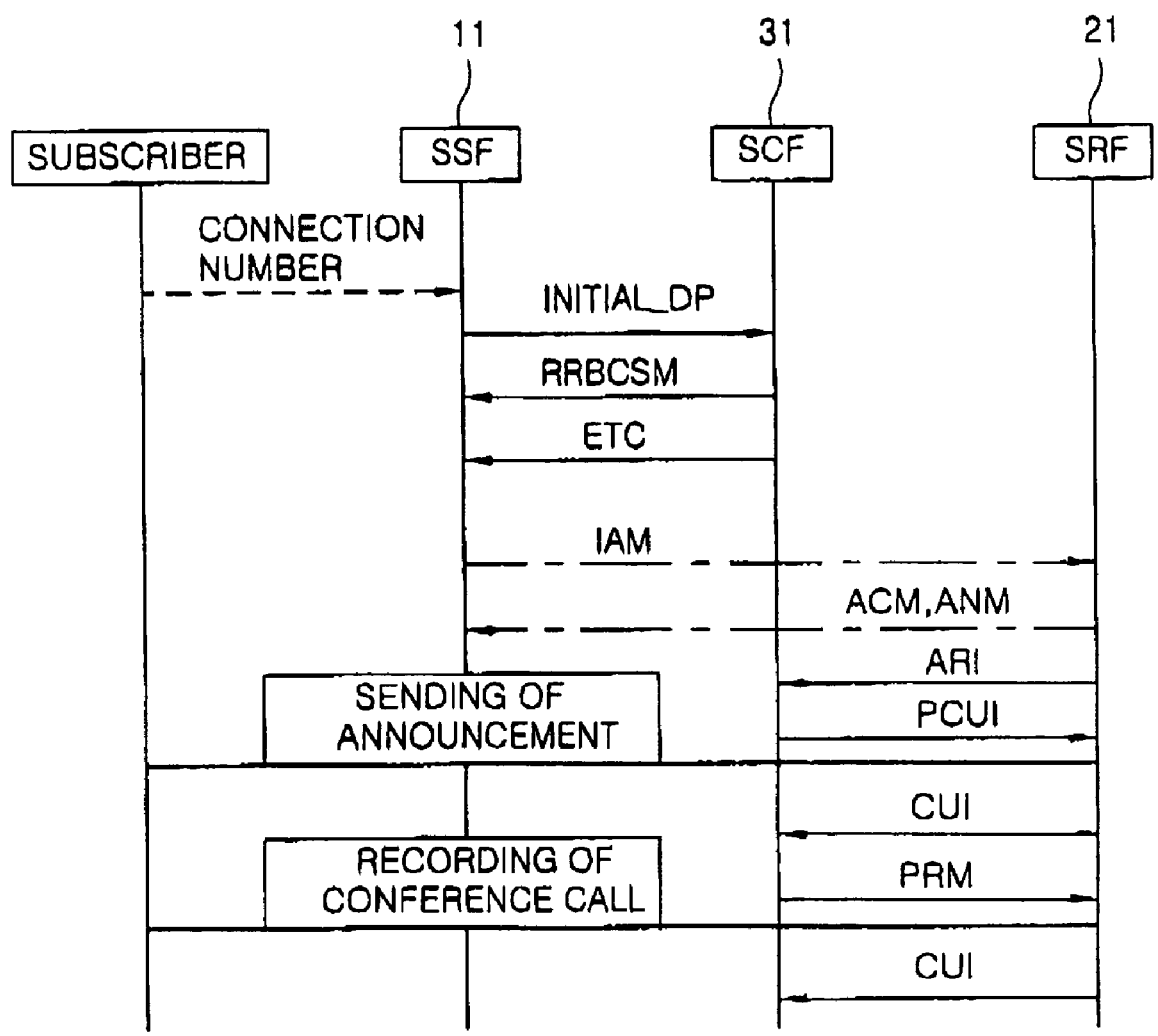
FIG. 4 is a drawing illustrating a method of a supplemental service in an intelligent network according to a second embodiment of the present invention.

Referring next to FIG. 4, a procedure and flow of signals in a conference call recording service is described.

The subscriber who convenes a conference first dials a service code by making a handset off-hook. This code is translated by an originating station, and thereafter is routed to the SSF 11 along with the numbers of the subscribers who will participate in the conference.

The SSF 11 then transfers an Initial_DP message to the SCF 31, and the SCF 31 analyzes the call to determine whether it is an intelligent network call. The SCF 31 also drives a conference calling service logic program. The SSF 11 then establishes a temporary connection between the SCP 30 and the IP 20 upon receipt of a RRBCSM operation and an ETC message from the SCF 31.

Next, the SRF 21 receives an IAM from the SSF 11, and answers with an ACM or ANM. A connection path for transmitting announcement of guidance and subscriber information is thus formed between the IP 20 and the SSP 10.

Meanwhile, the SCF 31 receives/records an ARI from the SRF 21, and sends a PCUI to the SRF 21 to instruct the SRF 21 to execute a PCUI. The IP 20 is thus made to send an announcement to the SSP 10.

A CUI is then sent from the SRF 21 to the SCF 31. The SCF 31 analyzes an user's selection and request upon receipt of the CUI from the SRF 21, and sends the SRF 21 to again execute the PCUI for thereby making the IP 20 send the announcement of the contents satisfying the user's selection and request.

The process in which the SCF 31 collects the CUI from the subscriber and instructs the SRF 21 to execute the PCUI is repeated until the subscriber is provided with a desired service. If the service requested by the subscriber is a conference call recording service, the SCF instructs the SRF 21 to record the conference call by sending a Play and Receive Message (PRM). When the recording is finished, the SRF 21 stores the record of the conference call in the database by sending a Specialized Resource Report (SRR) to the SCF 31. The subscriber can connect to and listen to the stored conference call whenever he or she wants.

As described above, the present invention as broadly described and embodied has many advantages. For example, the method can provide voice guidance regarding conference participants, absentees, and withdrawees and a conference call recording service by using a specific resource of the IP, which is one of the intelligent network elements, thereby providing a supplemental service of a high quality to subscribers.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of providing a conference call supplemental service in an intelligent network, comprising:

analyzing a call and driving a conference calling service logic program at a Service Control Point (SCP) of a communication network;

performing an intelligent network basic call processing function at a Service Switch Point (SSP) of the communication network;

establishing a temporary connection between the SCP and an intelligent peripheral (IP);

setting a direct route between the SSP and the IP; and announcing the service to a subscriber using the direct route between the SSP and the IP, without using the SCP to announce the service and collecting and processing subscriber information, wherein setting the direct route between the SSP and the IP comprises sending an initial address message from a Service Switch Function (SSF) of the SSP to a Specialized Resource Function (SRF) of the IP, and sending an address complete message or an answer message from the SRF to the SSF for transmitting the announcement of the service to the subscriber.

2. The method of claim 1, further comprising dialing a service code by a requesting subscriber, translating the dialed code by an originating station, and routing the code to a Service Switch Function of the SSP with numbers of subscribers who will participate in the conference call to initiate the conference calling service.

3. The method of claim 1, wherein analyzing the call and driving the conference calling service logic program comprises sending an initial detection point message from a Service Switch Function of the SSP to a Service Control Function of the SCP.

4. The method of claim 1, wherein performing the intelligent network basic call processing function comprises sending a request message from a Service Control Function of the SCP to a Service Switch Function of the SSP.

5. The method of claim 1, wherein establishing the temporary connection between the SCP and the IP comprises sending a request message from a Service Control Function of the SCP to a Service Switch Function of the SSP.

6. The method of claim 1, wherein announcing the service and collecting subscriber information comprises:
   transmitting an Assist Request Instruction from a Specialized Resource Function (SRF) of the IP to a Service Control Function (SCF) of the SCP;
   transmitting a Prompt Collect User Information command from the SCF to the SRF;
   sending a corresponding announcement of service guidance from the SRF to the SSF;
   collecting by the SRF digits and DTMF codes from the SSF and delivering them to the SCF; and
   analyzing the Collected User Information delivered to the SCF from the SRF to provide a service needed for the subscriber.

7. The method of claim 1, further comprising:
   instructing a Specialized Resource Function (SRF) of the IP to record the conference call by delivering a Play and Receive Message from a Service Control Function (SCF) of the SCP to the SRF;
   recording the conference call by the SRF;
   sending the record of the conference call from the SRF to the SCF; and
   storing the received record at the SRF.

8. A method of providing a conference calling supplemental service using an Intelligent Peripheral (IP) in an intelligent network, comprising:
   requesting a Service Switch Function (SSF) to initiate a conference calling service;
   sending a message from the SSF to a Service Control Function (SCF) to cause the SCF to analyze a call and drive a conference calling service logic program;
   analyzing the initial detection point message and driving a conference calling service logic program at the SCF;
   sending a message from the SCF to the SSF to request an intelligent network basic call processing function;
   sending a message from the SCF to the SSF to establish a temporary connection between a Service Control Point (SCP) and an IP;
   setting a direct route between a Service Switch Point (SSP) and an IP; and
   providing an announcement of service to a subscriber using the direct route between the SSP and the IP without initiating the SCP to announce the service, and collecting and processing subscriber information,
   wherein setting the direct route between the SSP and the IP comprises sending an initial address message from the SSF of the SSP to a Specialized Resource Function (SRF) of the IP, and sending an address complete message or an answer message from the SRF to the SSF for providing the announcement of the service to the subscriber.

9. The method of claim 8, wherein the route between the SSP and the IP is used to collect information from the subscriber necessary to perform the conference calling service, and to provide an announcement service.

10. The method of claim 8, wherein providing the announcement of service and collecting subscriber information comprises:
    transmitting an Assist Request Instruction from the SRF to the SCF;
    transmitting a Prompt Collect User Information command from the SCF to the SRF;
    sending a corresponding announcement of service guidance from the SRF to the SSF;
    collecting by the SRF digits and DTMF codes from the SSF and delivering them to the SCF; and
    analyzing the Collected User Information delivered to the SCF from the SRE to provide a service needed for the subscriber.

11. The method of claim 8, further comprising:
    delivering a Play and Receive Message from the SCF to the SRF instructing the SRF to record a conference call;
    recording the conference call by the SRF;
    receiving by the SCF the record of the conference call from the SRF; and
    storing the received record by the SCF.

12. The method of claim 11, wherein the subscriber can retrieve the stored record of the conference call at any time.

13. A communication system, comprising:
    a Service Control Point (SCP) coupled to a No. 7 signaling network, and configured to analyze a call and drive a conference calling service logic program;
    a Service Switching Point (SSP) coupled to the No. 7 signaling network, and configured to perform an intelligent network basic call processing function; and
    an intelligent peripheral (IP) coupled to the No. 7 signaling network,
    wherein a direct route is established between the SSP and the IP to perform a conference calling supplemental service using the IP and to announce the conference calling supplemental service using the direct route between the IP and SSP such that the SCP need not announce the service,
    wherein an initial address message is sent from a Service Switch Function (SSF) of the SSP to a Specialized Resource Function (SRF) of the IP, and an address complete message or an answer message is sent from the SRF to the SSF to set the direct route between the SSP and the IP for transmitting the announcement of this service to the subscriber.

14. The system of claim 13, wherein an initial detection point message is sent from a Service Switch Function of the SSP to a Service Control Function of the SCP to analyze a call and drive a conference calling service logic program.

15. The system of claim 13, wherein a request message is sent from a Service Control Function of the SCP to a Service Switch Function of the SSP to request an intelligent network basic call processing function.

16. The system of claim 13, wherein a request message is sent from a Service Control Function of the SCP to a Service Switch Function of the SSP to establish a temporary connection between the SCP and the IP.

17. The system of claim 13, wherein the conference calling supplemental service is announced and subscriber information is collected by transmitting an Assist Request Instruction from the SRF to the SCF, transmitting a Prompt Collect User Information command from the SCF to the SRF, sending a corresponding announcement of service guidance from the SRF to the SSF, collecting by the SRF digits and DTMF codes from the SSF and delivering them to the SCF, and analyzing the Collected User Information delivered to the SCF from the SRE to provide a service needed for the subscriber.

18. The system of claim 13, wherein the conference call is recorded by delivering a Play and Receive Message from a Service Control Function (SCF) of the SCP to the SRF to instruct a Specialized Resource Function (SRF) of the IP to record the conference call, recording the conference call by the SRF sending the record of the conference call from the SRF to the SCF, and storing the received record at the SCF.

19. A method of providing a conference call supplemental service in an intelligent network, comprising:
   setting a direct route between a Service Switch Point (SSP) and an Intellectual Peripheral (IP); and
   announcing, via the IP, the conference call supplemental service to a subscriber using the direct route between the SSP and the IP without using a Service Control Point (SCP) to announce the service,
   wherein setting the direct route between the SSP and the IP comprises sending an initial address message from a Service Switch Function (SSF) of the SSP to a Specialized Resource Function (SRF) of the IP, and sending an address complete message or an answer message from the SRF to the SSF for transmitting the announcement of the service to the subscriber.

20. The method of claim 19, further comprising:
   analyzing a call and driving a conference calling service logic program at the Service Control Point (SCP) of a communication network;
   performing an intelligent network basic call processing function at the SSP of the communication network; and
   establishing a temporary connection between the SCP and an intelligent peripheral (IP).

21. The method of claim 19, wherein announcing the service and collecting subscriber information comprises:
   transmitting an Assist Request Instruction from a Specialized Resource Function (SRF) of the IP to a Service Control Function (SCF) of the SCP;
   transmitting a Prompt Collect User Information command from the SCF to the SRF;
   sending a corresponding announcement of service guidance from the SRF to the SSF;
   collecting by the SRF digits and DTMF codes from the SSF and delivering them to the SCF; and
   analyzing the Collected User Information delivered to the SCF from the SRE to provide a service needed for the subscriber.

* * * * *